(No Model.)
A. L. HUGHES.
GRASS CATCHING ATTACHMENT FOR LAWN MOWERS.
No. 471,386. Patented Mar. 22, 1892.
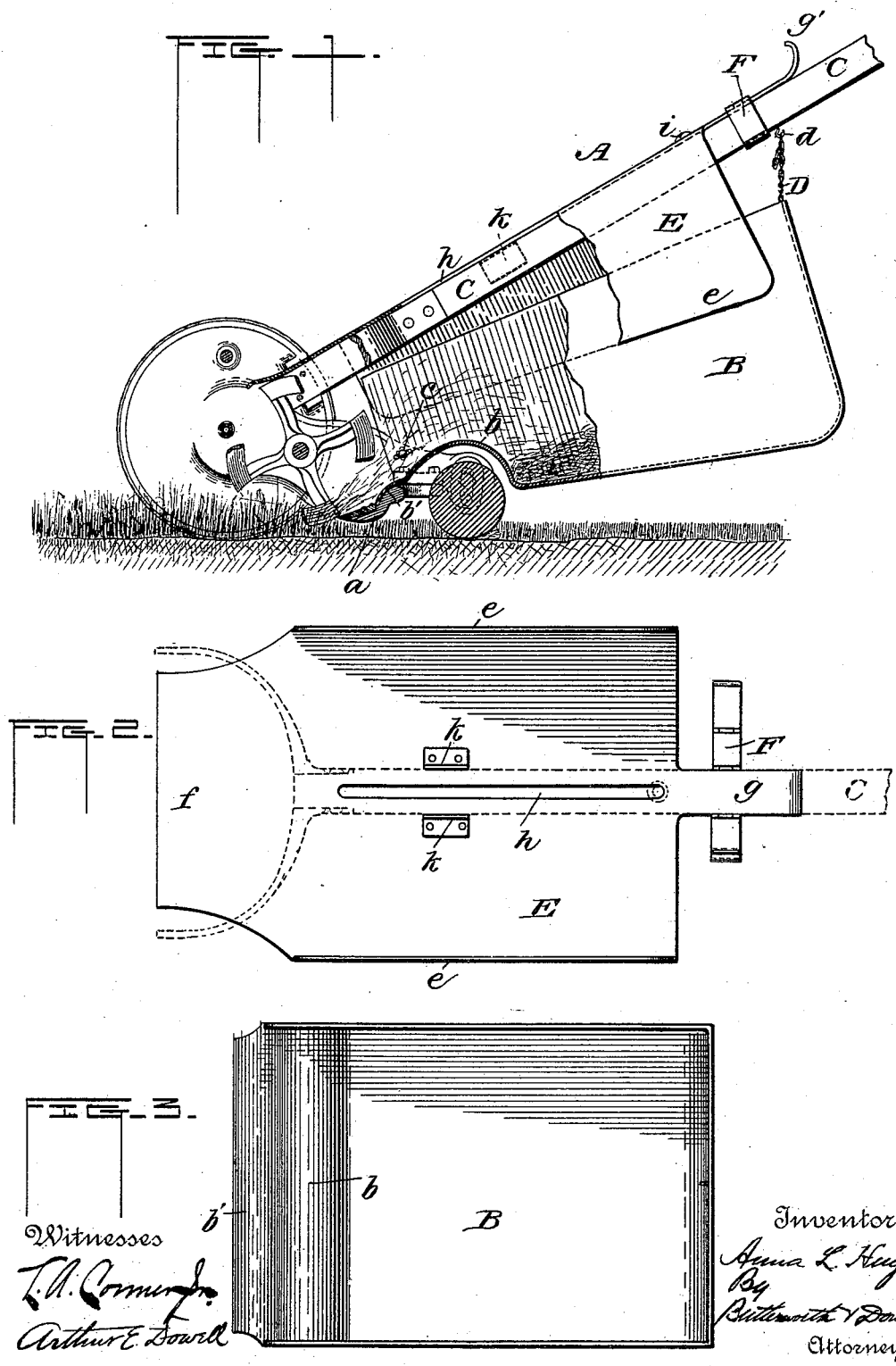

UNITED STATES PATENT OFFICE.

ANNA L. HUGHES, OF ASHLEY, PENNSYLVANIA.

GRASS-CATCHING ATTACHMENT FOR LAWN-MOWERS.

SPECIFICATION forming part of Letters Patent No. 471,386, dated March 22, 1892.

Application filed August 3, 1891. Serial No. 401,565. (No model.)

*To all whom it may concern:*

Be it known that I, ANNA L. HUGHES, a citizen of the United States, residing at Ashley, in the county of Luzerne and State of Pennsylvania, have invented certain new and useful Improvements in Grass-Catching Attachments for Lawn-Mowers; and I do hereby declare the following to be a full, clear, and exact description of the invention, such as will enable others skilled in the art to which it appertains to make and use the same.

My invention relates to improvements in grass-catching attachments for lawn-mowers; and the object is to provide a simple and inexpensive contrivance which may be readily attached to lawn-mowers of ordinary construction and which is adapted to receive and retain the grass without clogging or interfering with the operation of the cutting-knives.

The invention will first be described in connection with the accompanying drawings, and then particularly defined in the claims at the end of this description.

In the accompanying drawings, in which like letters of reference are used to designate like parts of the machine, Figure 1 represents a sectional side elevation of my invention applied to a lawn-mower. Fig. 2 is a bottom plan of the deflecting cover, the handle or tongue of the machine to which it is attached being indicated in dotted lines; and Fig. 3 is a plan of the box or grass-receiver.

A designates a lawn-mower of ordinary construction, to which my improved grass-catching attachments are applied.

B designates a box or grass-receiver, which is preferably formed by cutting or stamping the same integrally out of sheet metal; but of course other material may be used, and, if desired, the box may be constructed with separable back, sides, and bottom. The bottom of the box is formed with a curved or hipped front $b$, which is raised above the rear portion thereof, so as to form an abutment or barrier to prevent the grass from escaping at the open front or being thrown forward upon the knives in all ordinary positions of the mower, and which at the same time is of such shape that it will not form an obstruction on which the grass may catch or lodge either in receiving or emptying the contents of the box. The raised curved portion $b$ is provided with a flange $b'$, which is adapted to rest its entire length upon the horizontal bar $a$, to which the shearing-blade of the mower is secured, so that the front edge of this flange will be flush with the rear edge of said blade, and thus form, practically, an unbroken surface, over which the grass may slide or be thrown by the rotary cutter without being obstructed by coming in contact with the front edge of the box. The box may be secured at its front end to the rear of the frame of the machine by bolts, which pass through elongated slots $c$ in the sides of the box, and its rear end is suspended from the tongue or shaft C by an adjusting-chain D and screw-hook $d$, as shown in Fig. 1. By this means the box is adapted to be adjusted, so as to raise or lower its rear end, as may be desired, and for the purpose of attaching the same to the different mowers; but the attachment is designed to be permanent and the box rigidly secured in position upon the mower, so as to prevent wabbling thereof, while at the same time the box is removably secured to the machine.

E designates a deflecting cover, which is also preferably cut or stamped out of sheet metal, but which may be made of other material. This cover is provided with depending sides $e$, which overhang the sides of the box B and inclose the same sufficiently to prevent the grass from being thrown out at the sides of the box. The front end $f$ of the cover E may be made slightly tapering, as shown, and extends forward over the revolving knives of the cutter when in use, so as to form a projecting hood therefor, and the rear end of the cover has an extension $g$, which is of about the same width as the handle bar or tongue C and terminates in an upturned portion $g'$, which is adapted to serve as a handle for sliding the cover back and forth upon the bar C for the purpose of emptying the contents of the box. The cover E is also provided with a longitudinal slot $h$ to receive a screw or bolt $i$, by which the cover is adjustably secured to handle-bar, and at either side of the slot, underneath the cover, are attached guides $k\ k$. (Shown in full lines in Fig. 2 and in dotted lines in Fig. 1.) These guides embrace the tongue or handle bar and assist in retaining the cover in proper position thereon, and at the same time hold and guide the cover in its movements back and forth upon said bar. A suitable clasp or fastening device F, secured to the extension $g$ of the cover and encircling said extension and tongue C, as indicated in Fig. 1, serves to bind the rear end of the cover to the handle-bar.

The operation of the invention will be readily understood from the foregoing description. As the mower is propelled forward the grass will be cut and delivered from the knives into the box or receptacle B, and retained therein until it is desired to empty the box, which may be done by pulling the cover E by means of the handle $g'$ until the end of the slot $h$ nearest the cutters is drawn against the screw or bolt $i$, and thereupon the handle-bar C may be raised, so as to invert the box B and dump its contents, a single revolution of the mower when inverted being sufficient to clear the receptacle of grass.

Having thus described my invention, what I claim as new, and desire to secure by Letters Patent, is—

1. A grass-catching attachment for lawn-mowers, comprising a receptacle adjustably suspended at its rear end and provided with an open front which is rigidly secured to the frame of the machine, together with a deflecting sliding cover supported upon the handle-bar and having depending sides or wings which overhang the sides of the receptacle, substantially as described.

2. In combination with a lawn-mower, the grass-receptacle consisting of a sheet-metal box having an open top and front, the bottom of the box being formed with a hipped portion or transverse ridge at the front, forming a barrier to prevent the escape of grass, while permitting a free entrance thereof, together with a longitudinally-sliding cover supported upon the handle-bar and provided with depending sides or wings overhanging the receptacle, substantially as described.

3. In combination with a lawn-mower, the grass-receptacle and the deflecting sliding cover provided with the depending sides or wings, the hood, the rearwardly-extended handle, and means for adjustably securing the sliding cover upon the handle-bar, substantially as described.

4. A grass-catching attachment for lawn-mowers, comprising a receptacle rigidly secured to the frame of the machine and provided with an open front and top, and a deflecting cover provided with a forwardly-extended hood and a rearwardly-extended handle and with depending sides adapted to inclose the sides of said receptacle, said cover being arranged over the receptacle and independent thereof and adjustably secured to the machine, so that it may be moved back and forth thereon, substantially as described.

5. The combination, in a lawn-mower, of the grass-receptacle provided at the front with a transverse raised portion in the bottom thereof and with slotted sides, the suspending chain and hook, and the sliding cover provided with the longitudinal slot, the guides, the depending sides, the forwardly-extended hood, the handle, and means for securing said receptacle and cover to the mower, substantially as described.

In testimony whereof I affix my signature in presence of two witnesses.

ANNA L. HUGHES.

Witnesses:
J. K. P. FENNER,
JOHN W. COLBORN.